United States Patent
Ito

(10) Patent No.: US 10,753,260 B2
(45) Date of Patent: Aug. 25, 2020

(54) EXHAUST LEAK DETECTING APPARATUS

(71) Applicant: AISAN KOGYO KABUSHIKI KAISHA, Obu-shi, Aichi-ken (JP)

(72) Inventor: Yuzuru Ito, Chiryu (JP)

(73) Assignee: AISAN KOGYO KABUSHIKI KAISHA, Obu-shi (JP)

( * ) Notice: Subject to any disclaimer, the term of this patent is extended or adjusted under 35 U.S.C. 154(b) by 30 days.

(21) Appl. No.: 16/157,376

(22) Filed: Oct. 11, 2018

(65) Prior Publication Data

US 2019/0120112 A1   Apr. 25, 2019

(30) Foreign Application Priority Data

Oct. 25, 2017  (JP) ................................ 2017-206317

(51) Int. Cl.

| | | |
|---|---|---|
| *F01N 11/00* | (2006.01) | |
| *F02M 26/15* | (2016.01) | |
| *F01N 13/00* | (2010.01) | |
| *F01N 13/16* | (2010.01) | |
| *F02M 26/22* | (2016.01) | |

(52) U.S. Cl.
CPC ............ *F01N 11/00* (2013.01); *F01N 13/008* (2013.01); *F01N 13/16* (2013.01); *F02M 26/15* (2016.02); *F02M 26/22* (2016.02); *F01N 2560/025* (2013.01); *F01N 2560/08* (2013.01)

(58) Field of Classification Search
CPC combination set(s) only.
See application file for complete search history.

(56) References Cited

U.S. PATENT DOCUMENTS

| | | | |
|---|---|---|---|
| 10,393,044 B2* | 8/2019 | Ito ............................ | F02D 37/02 |
| 10,480,368 B2* | 11/2019 | Santillo ................... | F01N 3/035 |
| 2005/0102094 A1* | 5/2005 | Satoya ................... | F01N 11/007 701/114 |
| 2005/0161029 A1* | 7/2005 | Ishikawa ............. | F02D 41/0065 123/568.16 |
| 2006/0080028 A1* | 4/2006 | Moser ..................... | F01N 3/035 701/114 |
| 2019/0316538 A1* | 10/2019 | Martin .................... | F02B 39/10 |

FOREIGN PATENT DOCUMENTS

| | | |
|---|---|---|
| JP | S60-050217 A | 3/1985 |
| JP | 3444458 B2 | 9/2003 |
| JP | 2005-140075 A | 6/2005 |
| JP | 2007-262895 A | 10/2007 |
| JP | 2009-024630 A | 2/2009 |
| JP | 2013-221442 A | 10/2013 |

\* cited by examiner

*Primary Examiner* — Binh Q Tran
(74) *Attorney, Agent, or Firm* — Oliff PLC

(57) ABSTRACT

An exhaust leak detecting apparatus includes an exhaust pressure sensor to detect the exhaust pressure in a portion of an exhaust passage that allows exhaust gas discharged from an engine to flow therethrough, the portion being located at a position upstream of a catalyst for purifying exhaust gas, and an exhaust leak determining part to determine that exhaust gas is leaking or may leak from the exhaust passage upstream of the catalyst and generate a warning when the exhaust pressure detected by the exhaust pressure sensor falls outside a predetermined range.

12 Claims, 5 Drawing Sheets

EXHAUST LEAK DETECTING APPARATUS

CROSS-REFERENCE TO RELATED APPLICATIONS

This application is based upon and claims the benefit of priority from the prior Japanese Patent Application No. 2017-206317 filed on Oct. 25, 2017, the entire contents of which are incorporated herein by reference.

BACKGROUND

Technical Field

The present disclosure relates to an exhaust leak detecting apparatus for detecting a leak of exhaust gas in an exhaust passage at a position upstream of a catalyst.

Related Art

In recent years, vehicle emission controls are severely required in every country. Accordingly, automobile manufacturers have adapted vehicles to meet the emission control requirements by purifying exhaust gas through a catalyst provided in an exhaust passage and then release the purified gas into atmosphere while performing an air-fuel ratio control to fully utilize the performance of the catalyst.

Herein, a conventional art of the catalyst is disclosed in, for example, Japanese unexamined patent application publication No. 2011-221442 (JP2013-221442A) in which when the exhaust pressure at a position upstream of the catalyst in an exhaust passage becomes a predetermined pressure or higher, it is determined that a deposited amount of particulate matter (PM) in the catalyst becomes a predetermined amount or more and thus the temperature of the exhaust gas that will flow in the catalyst is controlled to rise ire order to oxidize and remove the PM.

SUMMARY

Technical Problems

If an exhaust leak occurs in the exhaust passage at a position upstream of the catalyst, harmful components contained in the exhaust gas are released into atmosphere without being purified or removed through the catalyst. If a driver of a vehicle does not notice the exhaust leak, the vehicle may be continuously driven while releasing the exhaust gas with harmful components contained therein. Thus, such an unpurified exhaust gas that has not passed through the catalyst may increase air pollution, Therefore, JP2013-221442A discloses the technique of oxidizing and removing the PM accumulated in the catalyst; however, discloses no measures against the occurrence of exhaust leak in the exhaust passage upstream of the catalyst.

The present disclosure has been made to address the above problems and has a purpose to provide an exhaust leak detecting apparatus capable of detecting a leak of exhaust gas in an exhaust passage upstream of a catalyst to reduce air pollution.

Means of Solving the Problems

To achieve the above-mentioned purpose, one aspect of the present disclosure provides an exhaust leak detecting apparatus comprising: an exhaust pressure detecting part configured to detect pressure of exhaust gas in an exhaust passage at a position upstream of a catalyst provided in the exhaust passage, the exhaust passage being configured to allow the exhaust gas that is discharged from an internal combustion engine to flow through the exhaust passage and the catalyst being configured to purify the exhaust gas; and an exhaust leak determining part configured to determine that the exhaust gas is leaking or may leak from the exhaust passage upstream of the catalyst and generate a warning when the exhaust pressure detected by the exhaust pressure detecting part falls outside a predetermined range.

According to the above aspect, the exhaust pressure in the exhaust passage at the position upstream of the catalyst is detected to thereby determine whether exhaust gas leaks in a portion of the exhaust passage upstream of the catalyst. If it is determined that an exhaust leak is occurring or may occur, a warning of exhaust leak is generated. This can promote immediate repair of the exhaust passage to reduce release of unpurified exhaust gas into atmosphere, thereby enabling to minimize air pollution. It is therefore possible to detect a leak of exhaust gas from the exhaust passage upstream of the catalyst, so that a reduction in air pollution can be achieved.

DETAILED DESCRIPTION OF THE EXEMPLARY EMBODIMENTS

A detailed description of an embodiment of an exhaust leak detecting apparatus which is one of typical embodiments of this disclosure will now be given referring to the accompanying drawings. Firstly, a controller 1 for internal combustion engine including an exhaust leak detecting apparatus 10 in the present embodiment will be described, and then the exhaust leak detecting apparatus 10 will be described in detail.

Figure 1:
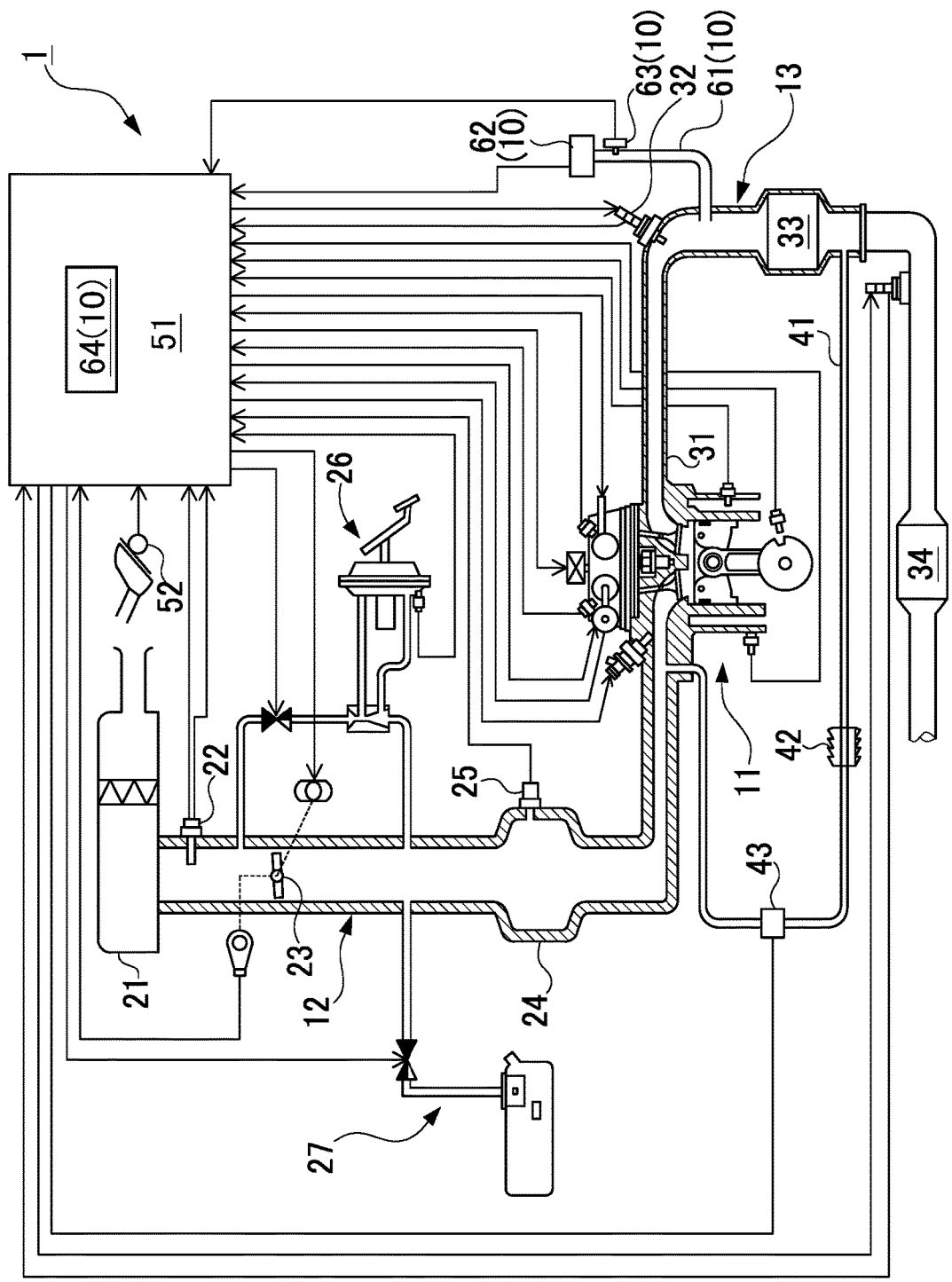
FIG. 1 is a schematic configuration diagram of a controller for an internal combustion engine including an exhaust leak detecting apparatus in the present embodiment.

As shown in FIG. 1, the controller 1 for an internal combustion engine includes an intake passage 12 connected to an engine 11 and configured to allow intake air to flow in the engine 11, and an exhaust passage 13 configured to allow exhaust gas to be discharged from the engine 11.

In the intake passage 12, there are mainly provided, in the order from an upstream side in an intake-air flowing direction, an air cleaner 21, an air flow meter 22 for measuring the amount of the intake air (intake air amount) ga, an electronic throttle device 23, and an intake manifold 24. The intake manifold 24 is provided with an intake pressure sensor 25 for detecting the pressure of the intake air (intake air pressure). In the intake passage 12, furthermore, a brake mechanism 26 and a mechanism 27 for purging vaporized fuel are placed.

In the exhaust passage 13, there are mainly provided, in the order from an upstream side in an exhaust-gas flowing direction, an intake manifold 31, an oxygen sensor 32, a catalyst 33 for purifying the exhaust gas, ad a muffler 34.

The controller 1 for internal combustion engine is provided with an EGR passage 41 (one example of an exhaust-gas recirculation passage) configured to allow part of exhaust gas discharged from the engine 1 into the exhaust passage 13 to return as EGR gas (one example of exhaust-gas recirculation gas) to the intake passage 12. In the EGR passage 41, there are provided an EGR cooler 42 (one example of an exhaust-gas recirculation cooling part) for cooling EGR gas and an EGR valve 43 (one example of an exhaust-gas recirculation valve) for regulating a flow rate of the EGR gas. In the present embodiment, the EGR passage 41 is connected to the exhaust passage 13 at a position downstream of the catalyst 33.

Furthermore, the controller 1 for internal combustion engine includes an ECU (engine control unit) 51. This ECU 51 is constituted for example of a microcomputer and provided with a ROM that stores a control program, a RAM that can read and write stored calculation results and others, a timer, a counter, an input interface, and an output interface. The ECU 51 is configured to perform various controls of the controller 1 for internal combustion engine.

The ECU 51 can receive detection signals from various sensors provided in the controller I for internal combustion engine. The various sensors may include the air flowmeter 22, the intake pressure sensor 25, the oxygen sensor 32, an accelerator pedal sensor 52, and an exhaust pressure sensor 62 and an exhaust temperature sensor 63 which will be described later.

The following description will be given to the exhaust leak detecting apparatus 10 provided in the controller 1 for internal combustion engine configured as above.

Herein, if exhaust gas leaks from a portion of the exhaust passage 13 upstream of the catalyst 33 and the leaked gas is directly released into atmosphere without passing through the catalyst 33, such an exhaust gas not purified by the catalyst 33 may increase air pollution. For instance, when a screw (not shown) that connects the exhaust manifold 31 and the catalyst 33 is loosely screwed, a vehicle may be driven while exhaust gas constantly leaks frons the exhaust passage 13 upstream of the catalyst 33. Further, even if the scree is somewhat loosely screwed, the pressure of exhaust gas rises as the intake air amount ga (the amount of intake air to be sucked into the engine 11) increases upon depression of an accelerator pedal and thus the exhaust gas may leak from somewhere in the exhaust passage 13 upstream of the catalyst 33. In a case where the catalyst 33 becomes clogged, moreover, the exhaust pressure also rises in the exhaust passage 13 upstream of the catalyst 33, so that the exhaust gas is apt to leak therefrom.

In the present embodiment, therefore, the exhaust leak detecting apparatus 10 is provided to detect such an exhaust leak in a portion of the exhaust passage 13 upstream of the catalyst 33 and generate a warning to a vehicle's driver to inform the exhaust leak. This exhaust leak detecting apparatus 10 mainly includes a channel 61, an exhaust pressure sensor 62 (one example of an exhaust pressure detecting part), an exhaust temperature sensor 63 (one example of an exhaust temperature detecting part), and an exhaust leak determining part 64.

The channel 61 is a branch passage branching off from the exhaust passage 13 at a position upstream of the catalyst 33. The exhaust pressure sensor 62 is connected to the channel 61 and configured to detect the pressure Pex in the exhaust passage 13 at the position upstream of the catalyst 33 (i.e., the exhaust pressure upstream of the catalyst). In the example shown in FIG. 1, the channel 61 branches off from the exhaust passage 13 at a position downstream of the oxygen sensor 32; however, not limited thereto, the channel may branch off from the exhaust passage 13 at a position upstream of the oxygen sensor 32.

Figure 2:
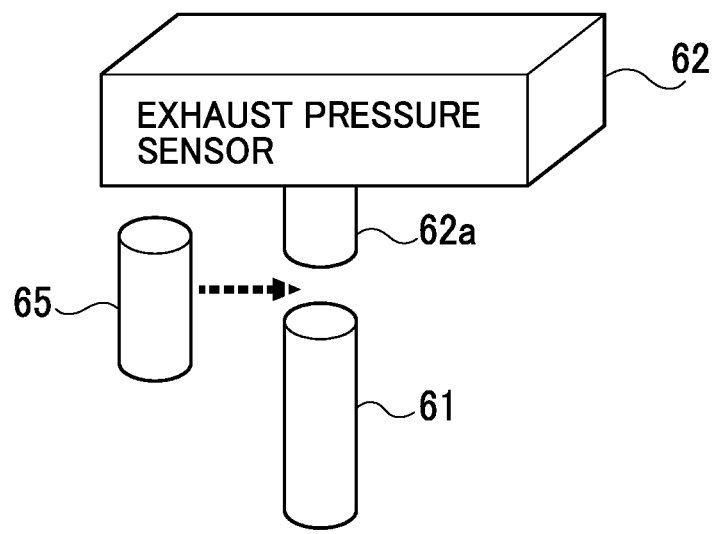
FIG. 2 is a diagram showing that a metal pipe is interposed between an inlet of an exhaust pressure sensor and a channel branching off from an exhaust passage.

Herein, the channel 61 is preferably made of metal because exhaust gas flows therethrough. Since such a metallic channel 61 easily transfers heat, a non-metallic pipe 65 is preferably interposed between the exhaust pressure sensor 62 and the channel 61 in such a way that the non-metallic pipe 65 is connected to an inlet 62a of the exhaust pressure sensor 62 and one end of the channel 61 as shown in FIG. 2. Specifically, the exhaust pressure sensor 62 is preferably coupled to the metallic channel 61 through the non-metallic pipe 65. This configuration can suppress heat transfer from the channel 61 to the exhaust pressure sensor 62 to protect the exhaust pressure sensor 62 against heat. Accordingly, the detection performance of the exhaust pressure sensor 62 can be maintained.

The exhaust temperature sensor 63 is provided near the exhaust pressure sensor 62 and configured to detect the temperature Tex of exhaust gas in the exhaust passage 13 at the position upstream of the catalyst 33. In the example shown in FIG. 1, as one example, the exhaust temperature sensor 63 is placed near the exhaust pressure sensor 62 in the channel 61.

The exhaust leak determining part 64 is configured to determine whether exhaust gas leaks from a portion of the exhaust passage 13 upstream of the catalyst 33 based on the exhaust pressure Pex detected by the exhaust pressure sensor 62. The exhaust leak determining part 64 is provided as part of the ECU 51 in the example shown in FIG. 1; however, not limited thereto, it may be provided separately from the ECU 51.

Figure 3:
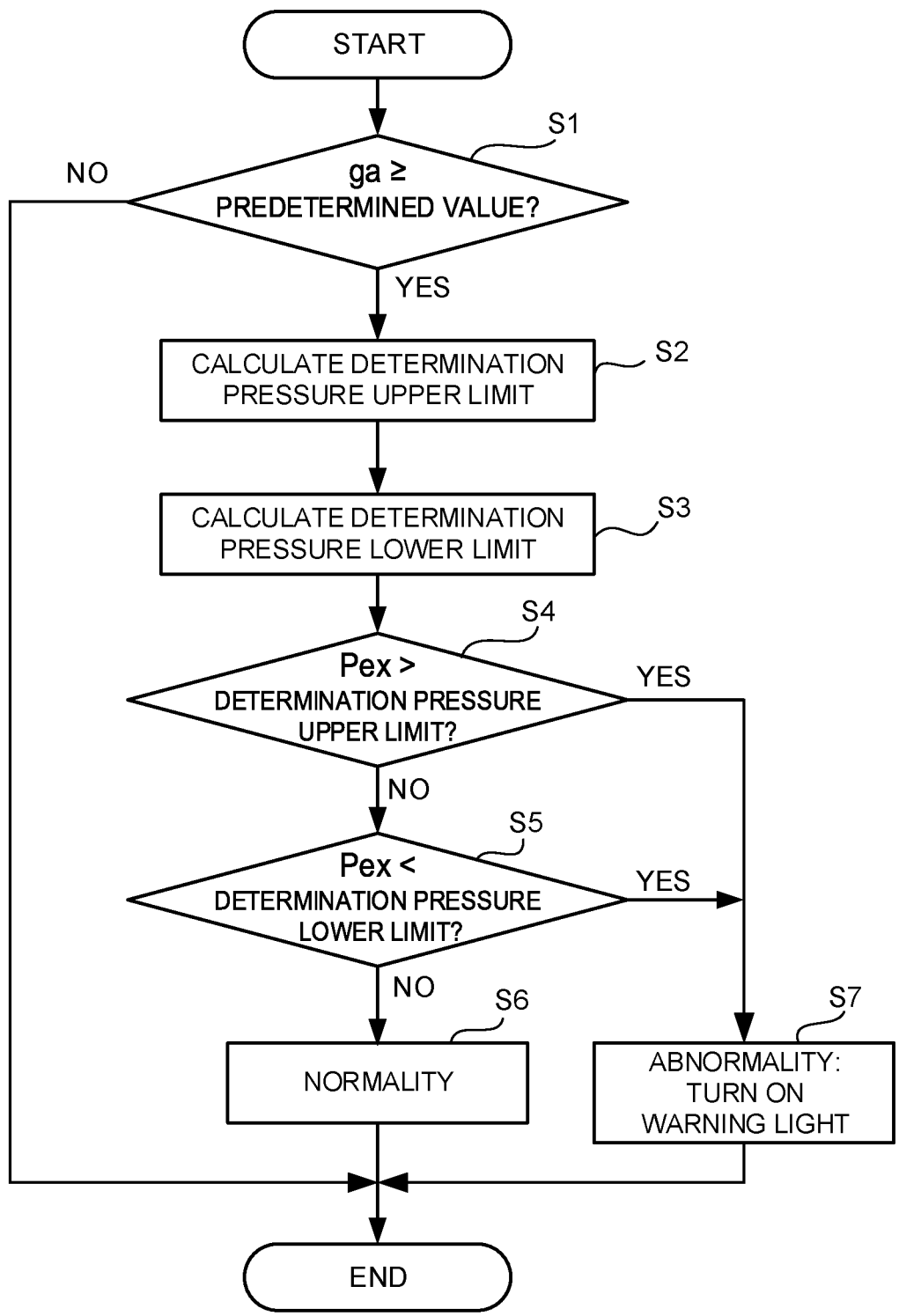
FIG. 3 is a flowchart showing a control operation to be performed by the exhaust leak detecting apparatus in the present disclosure.

In the exhaust leak detecting apparatus 10 configured as above, the exhaust leak determining part 64 is also configured to perform controls based on a control flowchart shown in FIG. 3.

As shown in FIG. 3, if the intake air amount ga is a predetermined value (a predetermined intake air amount a) or more (step S1: YES), a determination-pressure upper limit and a determination-pressure lower limit are calculated to determine whether the exhaust leak is present at a position upstream of the catalyst 33 in the exhaust passage 13 (steps S2 and S3). The intake air amount ga is measured by the air flow meter 22.

Herein, when the intake air amount ga is small, changes in the exhaust pressure become minimal, leading to a possibility that whether an exhaust leak is present cannot be accurately determined. In the present embodiment, therefore, this determination of the presence or absence of an exhaust leak is carried out when the intake air amount ga is equal to or more than the predetermined intake air amount α. At that time, the predetermined intake air amount α may be calculated based on functions of the engine revolutions per minute (RPM) and map values determined according to the engine RPM. The predetermined intake air amount a varies depending on the piston displacement and the pipe shape of the engine 11 and the type of the catalyst 33 and, for example, it is set to about 30 g/s for an engine 11 of 2000-cc displacement. Accordingly, the exhaust pressure sensor 62 can detect an exhaust gas pressure Pex of about 10 kPa.

The determination-pressure upper limit and the determination-pressure lower limit respectively correspond to an upper limit and a lower limit of a predetermined range. This predetermined range is a range of exhaust pressure for which exhaust leak determining part 64 determines that the exhaust passage 13 is in a normal state with no exhaust leak by determining whether an exhaust leak is present in the exhaust passage 13 upstream of the catalyst 33. Those determination pressure upper limit and determination-pressure lower limit are calculated based on the intake air amount ga and, for example, based on map values depending on the intake air amount ga and the functions of the intake air amount ga.

If the exhaust pressure Pex is equal to or lower than the determination-pressure upper limit (step S4: NO) and the exhaust pressure Pex is equal to or higher than the determination-pressure lower limit (step S5: NO), the exhaust leak determining, part 64 determines that the exhaust passage 13 has no exhaust leak and thus is normal (Normality determination) (step S6). In other words, when the exhaust pressure Pex fails within the predetermined range shown in FIG. 4, the normality of the exhaust passage 13 is determined.

In contrast, if the exhaust pressure Pex is higher than the determination-pressure upper limit (step S4: YES), the exhaust leak determining part 64 determines that the exhaust passage 13 is abnormal and accordingly turns on a warning light (Abnormality determination) (step S7). Specifically, when the exhaust pressure Pex is higher than the determination-pressure upper limit (the upper limit of the predetermined range) shown in FIG. 4, it is determined that the catalyst 33 is clogged. The exhaust leak determining part 64 therefore determines that exhaust gas is leaking or may leak from the exhaust passage 13 upstream of the catalyst 33 and turns on the warning light to give a driver a warning of the exhaust leak.

If the exhaust pressure Pex is equal to or lower than the determination-pressure upper limit (step S4: NO) and is less than the determination-pressure lower limit (step S5: YES), similarly, the abnormality is determined and the warning light is turned on (step S7). In other words, when the exhaust pressure Pex is lower than the determination pressure lower limit (the lower limit of the predetermined range) shown in FIG. 4, the exhaust leak determining part 64 determines that exhaust gas leaks from the exhaust passage 13 upstream of the catalyst 33 and thus turns on the warning light to give a driver a warning of the exhaust leak.

Figure 4:
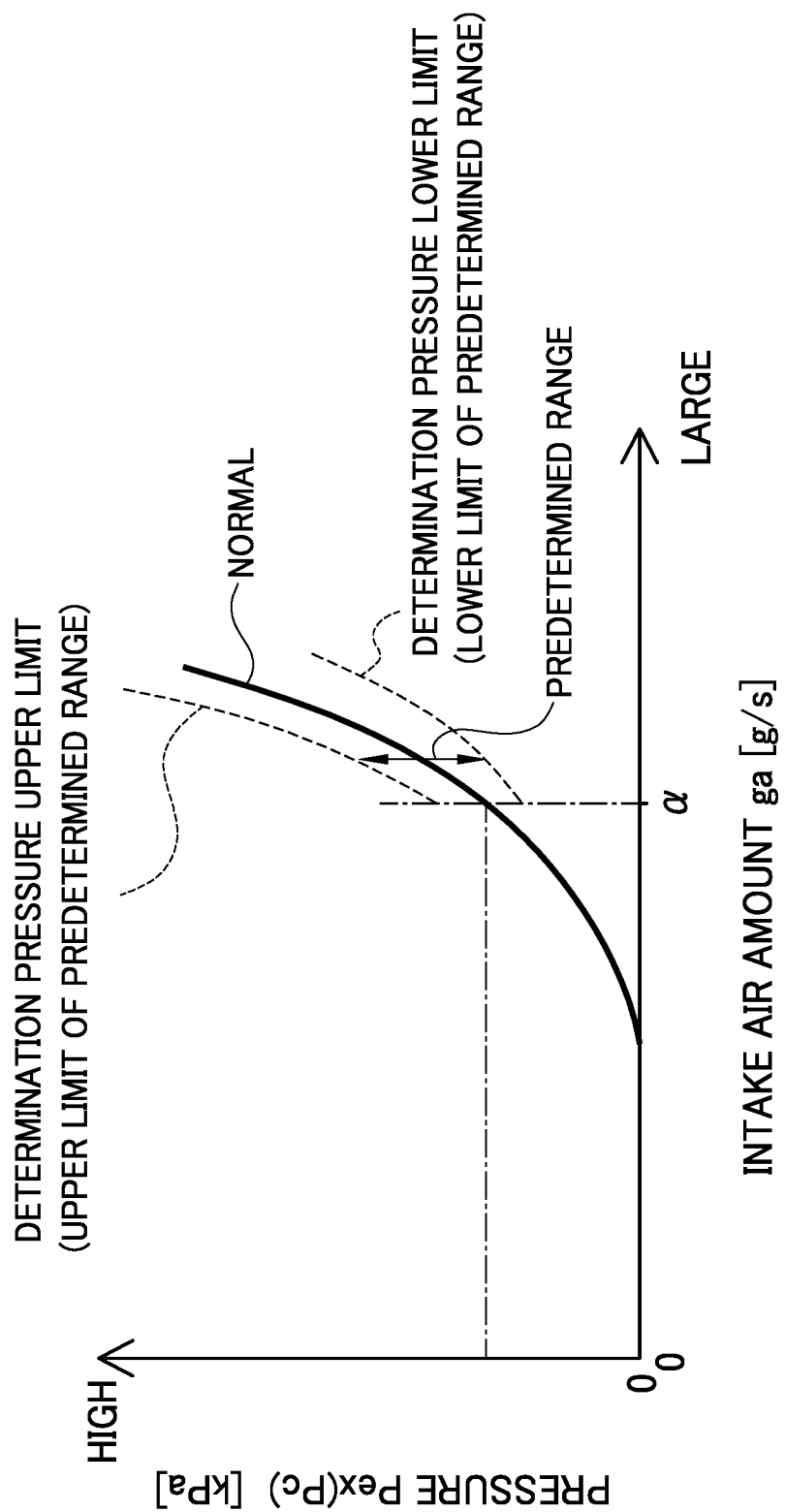
FIG. 4 is a graph showing a relationship between intake air amount and exhaust pressure in the exhaust passage at a position upstream of a catalyst.

In the present embodiment, as described above, the channel 61 is provided to take the exhaust pressure Pex of the exhaust passage 13 at the position upstream of the catalyst 33 from the exhaust passage 13 and the exhaust pressure sensor 62 is attached to an end of this channel 61. When the exhaust pressure Pex detected by the exhaust pressure sensor 62 falls outsides the predetermined range, the exhaust leak determining part 64 determines that exhaust gas is leaking or may leak from the exhaust passage 13 upstream of the catalyst 33 and generates a warning. In other words, as shown in FIG. 4, in the relationship between the intake air amount ga and the exhaust pressure Pex, the exhaust pressure Pex in the normal state of the exhaust passage 13 falls within the predetermined rage but the exhaust pressure Pex in the abnormal state of the exhaust passage 13 falls outside the predetermined range. Thus, the exhaust leak determining part 64 generates a warning thereof to a driver. It is to be noted that the pressure range from a reference pressure value (indicated by "Normal" in FIG. 4) to the determination-pressure upper limit of the predetermined range and the pressure range from the reference pressure value to the determination-pressure lower limit of the predetermined rage may be not equal to each other.

Furthermore, the exhaust leak determining part 64 may be configured to correct the exhaust pressure Pex according to a detection result of the exhaust temperature sensor 63 and determine whether an exhaust leak is present in the exhaust passage 13 upstream of the catalyst 33. Specifically, the exhaust leak determining part 64 may also perform the control based on the control flowchart shown in FIG. 3 by replacing the pressure Pex in FIG. 3 with a corrected pressure Pc.

Herein, the corrected pressure Pc is calculated by the following equation:

$$(Pc)=(Pex)\times(Tref)/(Tex) \qquad (Eq. 1)$$

where Tex represents the exhaust temperature detected by the exhaust temperature sensor 63 and Tref represents a reference temperature. The exhaust pressure Pex and the corrected pressure Pc are expressed for example in units of "kPa" and the the detected exhaust temperature Tex and the reference temperature Tref are expressed for example in units of "K.".

Figure 5:
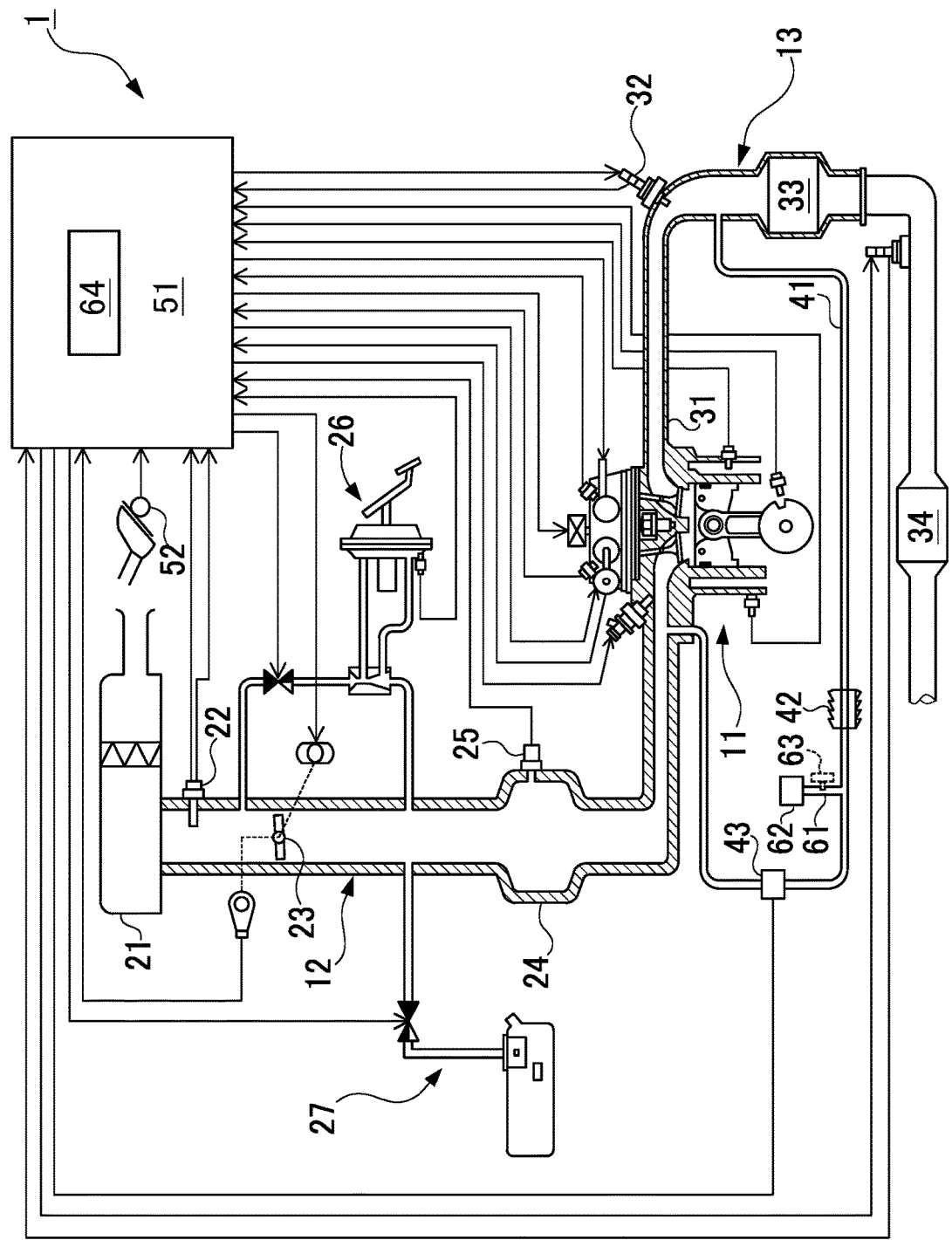
FIG. 5 is a schematic configuration diagram of a controller for an internal combustion engine including an exhaust leak detecting apparatus in a modified example.

FIG. 5 shows a modified example that the EGR passage 41 is connected to the exhaust passage 13 at a position upstream of the catalyst 33. In this example, the channel 61 and the exhaust pressure sensor 62 may be provided in the EGR passage 41 at a position downstream of an EGR cooler 42. In this case, the exhaust temperature sensor 63 may be provided near the exhaust pressure sensor 62 as illustrated by a dotted line in FIG. 5.

This configuration is advantageous in terms of temperature environment. Specifically, EGR gas cooled by the EGR cooler 42 flows to the EGR passage 41 at the position where the exhaust pressure sensor 62 is placed. This can avoid the exhaust pressure sensor 62 from being subjected to high temperature.

In this modified example, when the EGR valve 43 is opened, the internal pressure of the EGR passage 41 decreases, resulting in a decrease in the pressure to be detected by the exhaust pressure sensor 62. Therefore, the exhaust leak determining part 64 is configured to perform the control based on the control flowchart shown in FIG. 3 while the EGR valve 43 is in a closed state, and determine whether exhaust gas leaks from the exhaust passage 13 upstream of the catalyst 33.

In the exhaust leak detecting apparatus 10 in the present embodiment configured as above, when the exhaust pressure Pex detected by the exhaust pressure sensor 62 falls outside the predetermined range, the exhaust leak determining part 64 determines that exhaust gas is leaking or may leak from the exhaust passage 13 upstream of the catalyst 33, and thus generates a warning.

In the present embodiment described above, the exhaust pressure Pex at a position upstream of the catalyst 33 in the exhaust passage 13 is detected to determine whether an exhaust leak is present in the exhaust passage 13. When it is determined that the exhaust leak is occurring or may occur, a warning of the exhaust leak is given to a driver. This urges the driver to promptly repair the exhaust passage 13 and prevent release of unpurified exhaust gas into atmosphere and thus minimize air pollution. The exhaust leak determining part 64 (the exhaust leak detecting apparatus 10) can detect that the exhaust passage 13 has an exhaust leak in a portion upstream of the catalyst 33 and thus can suppress air pollution.

Furthermore, when the exhaust pressure Pex detected by the exhaust pressure sensor 62 is higher than the determination-pressure upper limit, the exhaust leak determining part 64 determines that the exhaust gas is leaking or may leak from the exhaust passage 13 upstream of the catalyst 33 because of clogging of the catalyst 33.

Accordingly, the exhaust leak determining pan 64 can detect that the catalyst 33 is clogged and give a warning thereof to a driver, thereby prompting the driver to immediately remove the clog from the catalyst 33. This can prevent release of unpurified exhaust gas into atmosphere and minimize air pollution.

The determination-pressure upper limit and the determination-pressure lower limit are calculated based on the intake air amount ga. Accordingly, whether an exhaust leak is present can be determined by use of an appropriate determination value according to the magnitude of the exhaust pressure that changes depending on the intake air amount ga.

Further, the exhaust leak determining part 64 determines whether an exhaust leak is present in the exhaust passage 13 when the intake air amount ga is equal to or larger than the predetermined intake air amount α. Accordingly, whether the exhaust passage 13 has an exhaust leak can be determined under the situation that the intake air amount ga is large and changes in the exhaust pressure Pex are likely to prominently appear.

Moreover, the exhaust leak determining part 64 corrects the exhaust pressure Pex detected by the exhaust pressure sensor 62 to the corrected pressure Pc based on the exhaust temperature Tex detected by the exhaust temperature sensor 63 and then determines whether an exhaust leak is present based on this corrected pressure Pc. In this manner, the exhaust pressure Pex is corrected based on the exhaust temperature Tex in consideration of the tendency of the pressure to change depending on the temperature. Consequently, whether the exhaust passage 13 has an exhaust leak can be accurately determined according to the exhaust temperature Tex.

In the embodiment mentioned above, the exhaust pressure sensor 62 is connected to the channel 61 through the non-metallic pipe 65. This can suppress heat transfer to the exhaust pressure sensor 62 to protect this sensor 62 from heat. Accordingly, the detection performance of the exhaust pressure sensor 62 can be maintained.

Moreover, in the configuration that the EGR passage 41 is connected to the exhaust passage 13 at a position upstream of the catalyst 33 in the exhaust passage 13, the exhaust pressure sensor 62 may be placed in a position downstream of the EGR cooler 42 in the EGR passage 41. In this configuration, the exhaust leak determining part 64 determines whether exhaust gas leaks based on the exhaust pressure Pex detected by the exhaust pressure sensor 62 while the EGR valve 43 is in a closed state. Accordingly, while the exhaust pressure sensor 62 can be prevented from being subjected to high temperature to maintain the detection performance of this sensor 62, it is possible to determine whether an exhaust leak is present in the exhaust passage 13 upstream of the catalyst 33.

The aforesaid embodiment is a mere example and does not place any limit on the present disclosure. Thus, the present disclosure may be embodied in other specific forms without departing from the essential characteristics thereof.

For instance, when a leakage amount of intake air in the intake passage 12 is less than a predetermined amount and the intake side is normal, the exhaust leak determining part 64 may be configured to determine whether an exhaust leak is present in the exhaust passage 13 upstream of the catalyst 33. As an alternative, when an intake air leak is occurring in the intake passage 12, the exhaust leak determining part 64 may be configured to determine the whether an exhaust leak is present in the exhaust passage 13 upstream of the catalyst 33 in consideration of the leakage amount of intake air.

The exhaust pressure sensor 62 and the exhaust temperature sensor 63 may also be provided with a protection against heat and then directly placed in the exhaust passage 13 without interposing the channel 61.

In the modified example shown in FIG. 5, the channel 61, the exhaust pressure sensor 62, and the exhaust temperature sensor 63 may also be placed in respective predetermined positions upstream of the EGR cooler 42 in the EGR passage 41 instead of the position downstream of the EGR cooler 42.

REFERENCE SIGNS LIST

1 Controller for internal combustion engine
10 Exhaust leak detecting apparatus
11 Engine
12 Intake passage
13 Exhaust passage
21 Air cleaner
22 Air flow meter
31 Exhaust manifold
33 Catalyst
41 EGR passage
42 EGR cooler
43 EUR valve
51 ECU
61 Channel
62 Exhaust pressure sensor
62*a* Entrance
63 Exhaust temperature sensor
64 Exhaust leak determining part
65 Pipe
ga Intake airflow amount
α Predetermined intake air amount
Pex Exhaust pressure
Pc Corrected pressure
Tex Exhaust temperature

What is claimed is:

1. An exhaust leak detecting apparatus comprising:
a pressure sensor configured to detect pressure of exhaust gas in an exhaust passage at a first position upstream of a catalyst provided in the exhaust passage, the exhaust passage being configured to allow the exhaust gas that is discharged from an internal combustion engine to flow through the exhaust passage and the catalyst being configured to purify the exhaust gas;
a temperature sensor configured to detect temperature of exhaust gas in the exhaust passage at a second position upstream of the catalyst; and
a computer programmed to:
correct the exhaust pressure detected by the pressure sensor based on the exhaust temperature detected by the temperature sensor;
determine that the exhaust gas is leaking or may leak from the exhaust passage upstream of the catalyst based on the corrected exhaust pressure; and
generate a warning when the exhaust pressure detected by the pressure sensor falls outside a predetermined range.

2. The exhaust leak detecting apparatus according to claim 1, wherein the computer is programmed to:
when the exhaust pressure detected by the pressure sensor is higher than an upper limit of the predetermined range, determine that the exhaust gas is leaking or may leak from the exhaust passage upstream of the catalyst due to clogging of the catalyst.

3. The exhaust leak detecting apparatus according to claim 1, wherein the upper limit and a lower limit of the predetermined range are calculated based on an amount of intake air to be sucked into the internal combustion engine.

4. The exhaust leak detecting apparatus according to claim 1, wherein the computer is programmed to:
when an amount of intake air to be sucked into the internal combustion engine is equal to or larger than a predetermined amount, determine whether an exhaust leak is present in the exhaust passage.

5. An exhaust leak detecting apparatus comprising:
a metallic branch passage branching off from an exhaust passage at a first position upstream of a catalyst in the exhaust passage, the exhaust passage being configured to allow exhaust gas that is discharged from an internal combustion engine to flow through the exhaust passage and the catalyst being configured to purify the exhaust gas;
a non-metallic passage connected to the branch passage;
a pressure sensor coupled to the branch passage through the non-metallic passage, the pressure sensor being configured to detect pressure of the exhaust gas in the exhaust passage upstream of the catalyst; and
a computer programmed to:
determine that the exhaust as is leaking or may leak from the exhaust passage upstream of the catalyst; and
generate a warning when the exhaust pressure detected by the pressure sensor falls outside a predetermined range.

6. An exhaust leak detecting apparatus comprising:
a pressure sensor configured to detect pressure of exhaust gas in an exhaust passage at a first position upstream of a catalyst provided in the exhaust passage, the exhaust passage being configured to allow the exhaust gas that is discharged from an internal combustion engine to flow through the exhaust passage and the catalyst being configured to purify the exhaust gas; and
a computer programmed to:
determine that the exhaust gas is leaking Or may leak from the exhaust passage upstream of the catalyst; and
generate a warning when the exhaust pressure detected by the pressure sensor falls outside a predetermined range,
wherein an exhaust-gas recirculation passage is connected to the exhaust passage at a second position upstream of the catalyst, the exhaust-gas recirculation passage being configured to allow part of the exhaust gas from the exhaust passage to flow as exhaust-gas recirculation gas to an intake passage configured to allow intake air to be sucked in the internal combustion engine to flow therethrough,
an exhaust-gas recirculation valve and an exhaust-gas recirculation cooler are provided in the exhaust-gas recirculation passage, the exhaust-gas recirculation cooler being configured to cool the exhaust-gas recirculation gas and the exhaust-gas recirculation valve being configured to regulate a flow rate of the exhaust-gas recirculation gas,
the pressure sensor is placed in a position downstream of the exhaust-gas recirculation cooler in the exhaust-gas recirculation passage, and
the computer is programmed to determine whether an exhaust leak is present while the exhaust-gas recirculation valve is in a closed state.

7. The exhaust leak detecting apparatus according to claim 5, wherein the computer is programmed to:
when the exhaust pressure detected by the pressure sensor is higher than an upper limit of the predetermined range, determine that the exhaust gas is leaking or may leak from the exhaust passage upstream of the catalyst due to clogging of the catalyst.

8. The exhaust leak detecting apparatus according to claim 5, wherein the upper limit and a lower limit of the predetermined range are calculated based on an amount of intake air to be sucked into the internal combustion engine.

9. The exhaust leak detecting apparatus according to claim 5, wherein the computer is programmed to:
when an amount of intake air to be sucked into the internal combustion engine is equal to or larger than a predetermined amount, determine whether an exhaust leak is present in the exhaust passage.

10. The exhaust leak detecting apparatus according to claim 6, wherein the computer is programmed to:
when the exhaust pressure detected by the pressure sensor is higher than an upper limit of the predetermined range, determine that the exhaust gas is leaking or may leak from the exhaust passage upstream of the catalyst due to clogging of the catalyst.

11. The exhaust leak detecting apparatus according to claim 6, wherein the upper limit and a lower limit of the predetermined range are calculated based on an amount of intake air to be sucked into the internal combustion engine.

12. The exhaust leak detecting apparatus according to claim 6, wherein the computer is programmed to:
when an amount of intake air to be sucked into the internal combustion engine is equal to or larger than a predetermined amount, determine whether an exhaust leak is present in the exhaust passage.

* * * * *